United States Patent
Chen

(10) Patent No.: US 7,400,623 B2
(45) Date of Patent: Jul. 15, 2008

(54) METHOD AND APPARATUS FOR MANAGING MEDIUM ACCESS CONTROL (MAC) ADDRESS

(75) Inventor: Chia-Hsin Chen, Taipei (TW)

(73) Assignee: Genesys Logic, Inc., Taipie County (TW)

( * ) Notice: Subject to any disclaimer, the term of this patent is extended or adjusted under 35 U.S.C. 154(b) by 608 days.

(21) Appl. No.: 11/142,283

(22) Filed: Jun. 2, 2005

(65) Prior Publication Data
US 2006/0274739 A1    Dec. 7, 2006

(51) Int. Cl.
*H04L 12/56* (2006.01)
*H04L 12/43* (2006.01)

(52) U.S. Cl. .................... 370/389; 370/458
(58) Field of Classification Search .......... 370/389, 370/458, 254, 255, 313, 336, 337, 349, 368, 370/371, 374, 376, 379, 382, 383, 392, 400, 370/401, 428, 429, 442, 474, 363; 711/5, 711/100–102, 104, 108, 147, 149
See application file for complete search history.

(56) References Cited

U.S. PATENT DOCUMENTS 6,829,651 B1 * 12/2004  Bass et al. ................. 709/238
7,099,321 B2 *  8/2006  Hu et al. .................... 370/389

\* cited by examiner

*Primary Examiner*—Chirag G Shah
*Assistant Examiner*—Srinivasa R Reddivalam
(74) *Attorney, Agent, or Firm*—Rosenberg, Klein & Lee

(57) ABSTRACT

A method for managing medium access control (MAC) address and related apparatus are provided, including an MAC address learning method and an MAC addresses inquiring method. The learning method includes the steps of: mapping an MAC address to a designated slot and a companion slot in an address table; if said designated slot being empty, learning said MAC address into said designated slot; and if said designated slot being non-empty, said companion slot being empty and the content of said designated slot being non-static, moving the content of said designated slot to said companion slot and modifying a bit of the higher part of said MAC address in said companion slot and learning said MAC address into said designated slot.

20 Claims, 5 Drawing Sheets

METHOD AND APPARATUS FOR MANAGING
MEDIUM ACCESS CONTROL (MAC)
ADDRESS

BACKGROUND OF THE INVENTION

1. Field of the Invention

The present invention generally relates to a method and related apparatus for managing an address table and, more particularly, to a method for managing a medium access control address table and related media access control chip.

2. The Related Art

An Ethernet switch provides a plurality of ports for network connection. Each port can provide a full-duplex transmission at the line speed 10M/100M/1000M. The core of an Ethernet switch is a medium access controller (MAC controller), which is typically responsible for the second and part of the third layer and above operation. The MAC controller is coupled with a physical layer (PHY) for providing a plurality of ports for network connection to transmit and receive signals with a remote host. The MAC controller temporarily stores received packets from all the ports, and transfer them to the destination port. The MAC controller usually uses external memory chip or built-in memory for temporary storage of the packets, such as the built-in 1 Mbits (=128 Kbytes) RAM. As an Ethernet switch includes 8, 16 or 24 ports, the limited memory space must be efficiently utilized in order to provide these ports for temporary storage and transferring of packets.

The packets received by an Ethernet switch can be categorized as uni-cast packets, multi-cast packets, and broadcast packets. A unit-cast packet is received by a port of the Ethernet switch and transmitted from another port. A multi-cast packet is received by a port of the Ethernet switch and transmitted from a plurality of other ports. A broadcast packet is received by a port of the Ethernet switch and transmitted from all the other ports. In general, the maximum length of an Ethernet packet is 1522 bytes, and in NAS/SAN system, a jumbo packet can be as long as 9.6K bytes. The MAC controller uses external or built-in memory for temporary storage of packets, and the MAC controller must configure the external or built-in memory to establish an appropriate data structure and format in the initialization stage for later operation.

FIG. 1 of the attached drawings shows the structure of an Ethernet packet, which is designated with reference numeral 100. The Ethernet packet 100 includes a destination medium access control (DMAC) address 110, a source medium access control (SMAC) address 120, a payload 130, and a cyclic redundant code (CRC) 140. The Ethernet switch configures an address table in the built-in 128 Kbytes static RAM for recording the association between MAC address and ports, so that the switch can look up the table and quickly find the destination port for the received Ethernet packet 100. The majority of the static RAM is for buffering the packets received by all the ports. Each packet, after entering the switch, uses SMAC address 120 and its source port to appropriately record the information in the address table (called learning process) for later inquiry. On the other hand, The Ethernet switch will use DMAC address 110 for table lookup. If corresponding information is found, the associated port mask can be known. Otherwise, a broadcast will be performed.

FIG. 2 shows a schematic view of a dual-slot address table. The conventional dual-slot address access techniques, for example, configures address table 200 as 2K buckets, with each bucket having two slots. A bucket address can be used to find a specific bucket. Bucket 210 has a slot 210A and a slot 210B, and bucket 220 has a slot 220A and a slot 220B. That is, each of the 2K buckets has an A slot and a B slot. Each slot is for displaying the related information of MAC address. Each MAC address is 48-bit long, expressed as MAC[47:0]. Therefore, related information on at most 4K MAC addresses can be recorded. A direct map or hash method can be used to map an MAC address to a specific bucket address and slot. Typically, in the MAC address learning stage, each MAC address uses CRC-11 polynomial hashing computation to obtain the 11-bit bucket address Hash[10:0]. For example, when mapped to bucket 250, slot 250A is given the first priority to store the MAC address. If slot 250A has already stored another MAC address, slot 250B is used to store the 37 bits (i.e., MAC[47:11]) and related information of that MAC address. If the direct map method is used, MAC[10:0] is used as bucket address, and the 37 bits (i.e., MAC[47:11]) and related information of that MAC address are stored into the appropriate slot. The advantage of using a hash mapping method is to increase the randomness of the MAC address to prevent the neighboring MAC addresses from using the A or B slot of the same bucket and increase the opportunity of broadcasting.

When inquiring the DMAC address of a packet, the DMAC address is used in CRC-11 polynomial hashing computation to obtain the 11-bit bucket address Hash[10:0]. For example, if bucket 250 is mapped to, slot 250A is first compared for match. If MAC[47:11] in slot 250A matches DMAC[47;11] of the packet, the related information is available. If 250A does not match, slot 250B is compared against the DMAC of the packet. When both slots do not match, the packet is broadcasted.

Using a small part of the limited static RAM for address look-up table, the address table can only hold a small number of entries. The efficient use of the limit-sized address table is related to the switching efficiency of the Ethernet switch, and it is important to the forwarding control unit to find a solution.

SUMMARY OF THE INVENTION

The present invention provides a method for learning medium access control (MAC) address, including the steps of: using a hash function to compute a hash value of an MAC address, using the hash value to one-to-one map to a designated slot, and using the MAC address to map to the designated slot and a companion slot of the address table; if designated slot is empty, the MAC address is learned into the designated slot; if the designated slot is non-empty, the companion slot is empty and the contents in the designated slot is not static, the contents of the designated slot is moved to the companion slot, the fortieth bit of the higher MAC address of the contents in the companion slot is modified and the MAC address is learned into the designated slot; if both designated and companion slot are non-empty, the MAC address is learned into CAM; if the designated slot is non-empty, the companion slot is empty and the contents of the designated slot are static, the fortieth bit of the higher MAC address is modified and the modified MAC address is learned into the companion slot in response to the non-static learning command. This shows the learning advantage of a dual-slot address table and saves the hardware gates in the address table. For example, the address table has $2^X$ access slots, and each access slot can store the 48-X bits of the MAC address and related information. The MAC address is 48-bit long, and X is a positive integer. The related information preferably includes a port mask, an overtime counter and a static flag.

The present invention also provides a method for searching MAC address, including the steps of: using MAC address to map to the designated slot and the companion slot in the address table; reading a first content in the designated slot and a second content in the companion slot; selectively restore the second content; comparing MAC address with the first content and comparing the MAC address with the restored second content; and generating an inquiry result in accordance with the results of the comparison, such as port mask. For example, the selective restoration step is performed in accordance with the static flag of the second content and the fortieth bit of the higher MAC address.

The present invention further provides an MAC chip, including a buffer memory, having an address table, for storing packet; a plurality of port control units coupled to the PHY control chip; a forwarding control unit having content-addressable memory (CAM), coupled to port control unit; a queue control unit coupled to the forwarding control unit and the port control unit; and a buffer control unit coupled the buffer memory, the queue control unit and the port control units. The forwarding control unit uses MAC address to map to the designated slot and the companion slot in the address table. If the designated slot is empty, the MAC address is learned into the designated slot. If the designated slot is non-empty, the companion slot is empty and the content of the designated slot is non-static, the contents of the designated slot is moved to the companion slot, the fortieth bit of the higher MAC address of the contents in the companion slot is modified and the MAC address is learned into the designated slot.

BRIEF DESCRIPTION OF THE DRAWINGS

The present invention will be apparent to those skilled in the art by reading the following description of a preferred embodiment thereof and the best mode for carrying out the invention, with reference to the attached drawings, in which.

DETAILED DESCRIPTION OF THE PREFERRED EMBODIMENT

Figure 1:
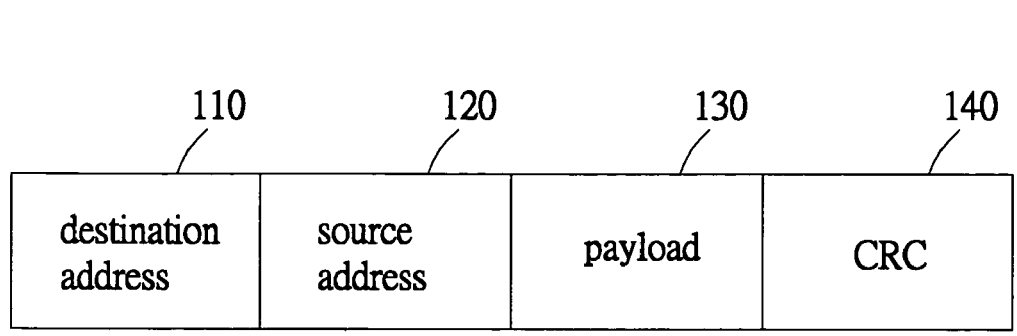
FIG. 1 shows a structure of an Ethernet packet.
Figure 2:
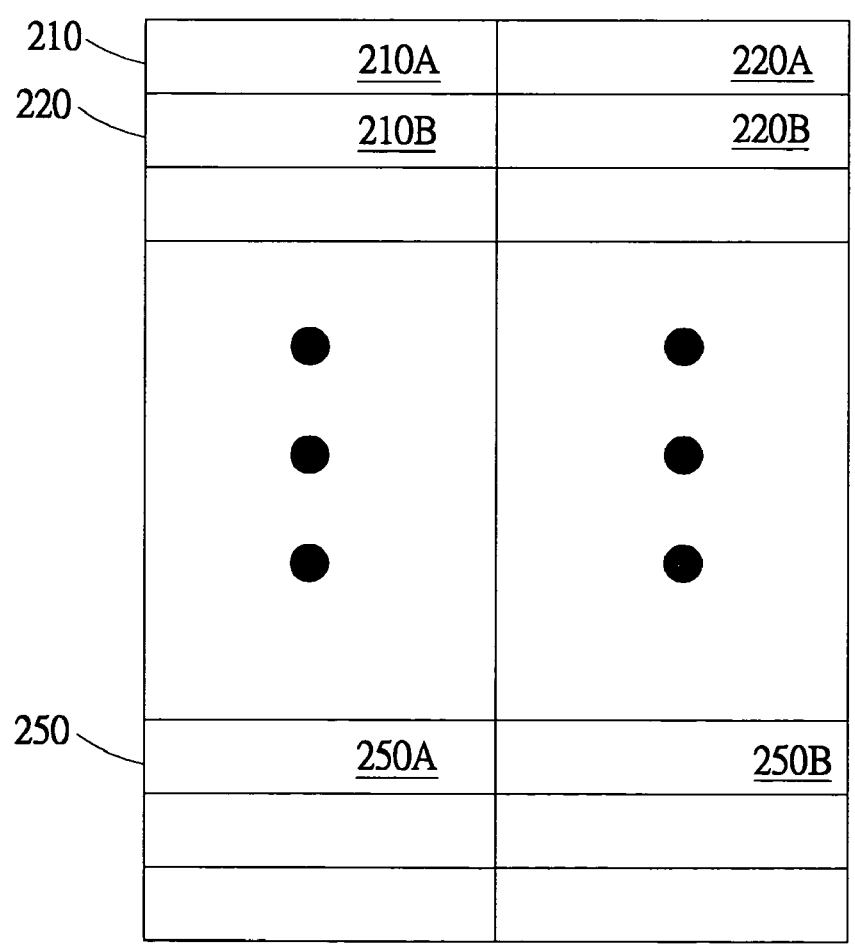
FIG. 2 shows a schematic view of a dual-slot address table.

FIG. 2 shows an address table 200 is configured to include 2K access buckets, with each bucket having an A slot and a B slot. In a preferred embodiment, a CRC-12 (or direct mapping) polynomial hash algorithm can be performed to obtain a 12-bit address Hash[11:0], which is mapped by a hash mapping to a specific slot. For example, using a $(X^{12}+X^{11}+X^3+X^2+X+1)$ CRC-12 polynomial hash algorithm to obtain a 12-bit address Hash[11:0]. Hash[11:1] points to a bucket address, and Hash[0] specifies a slot, for example, a "0" in Hash[0] indicating A slot, and a "1" in Hash[0] indicating B slot. Hence, the hash result Hash[11:0] of every MAC address points to a specific slot into which the 36-bit MAC[47:12] and MAC address related information are stored during the MAC address learning stage. Compared to the conventional techniques, every MAC address saves a bit in this embodiment, and thus 4K bits are saved for storing 4K MAC addresses related information. This is a prominent saving for limit-sized memory space.

An MAC controller uses a forwarding control unit (not shown) to perform MAC address and related information inquiry and learning. The learning of MAC address and related information can be classified as uni-cast address learning and multi-address learning. A uni-cast address can be learned by using the SMAC address and source port of every packet to establish the MAC address related information for later inquiry by the packets sending to the SMAC address. A multi-cast address can be learned by adding an external processor to the MAC controller or by using software to configure in address table 200.

In this preferred embodiment, the forwarding control unit uses content addressable memory (CAM) to store a plurality of addresses, for example, eight MAC addresses, for perfect match inquiries. The uni-cast address learning and multi-cast learning can be classified as dynamic learning and static learning. In the example of using an external processor, the multi-cast address learning are preferably performed by the processor to use address direct mapping scheme to configure in the designated location in address table 200, and stay there without ageing evacuation. Each Mac address is 48-bit long, expressed as MAC[47:0], and MAC[40] indicates if the MAC address is a multi-cast address.

During Mac address learning, if Hash[0] of the Hash[11:0] is "0" and Hash[11:1] points to an A slot whose content "hits" the higher MAC address MAC[47:12] ("hit" implies a match in a content matching), the A slot is cleared when a clear command of a static learning is received, and the higher Mac address MAC[47:12] and related information are written into the A slot designated by Hash[11;1] when an add command of a static learning is received.

Figure 3:
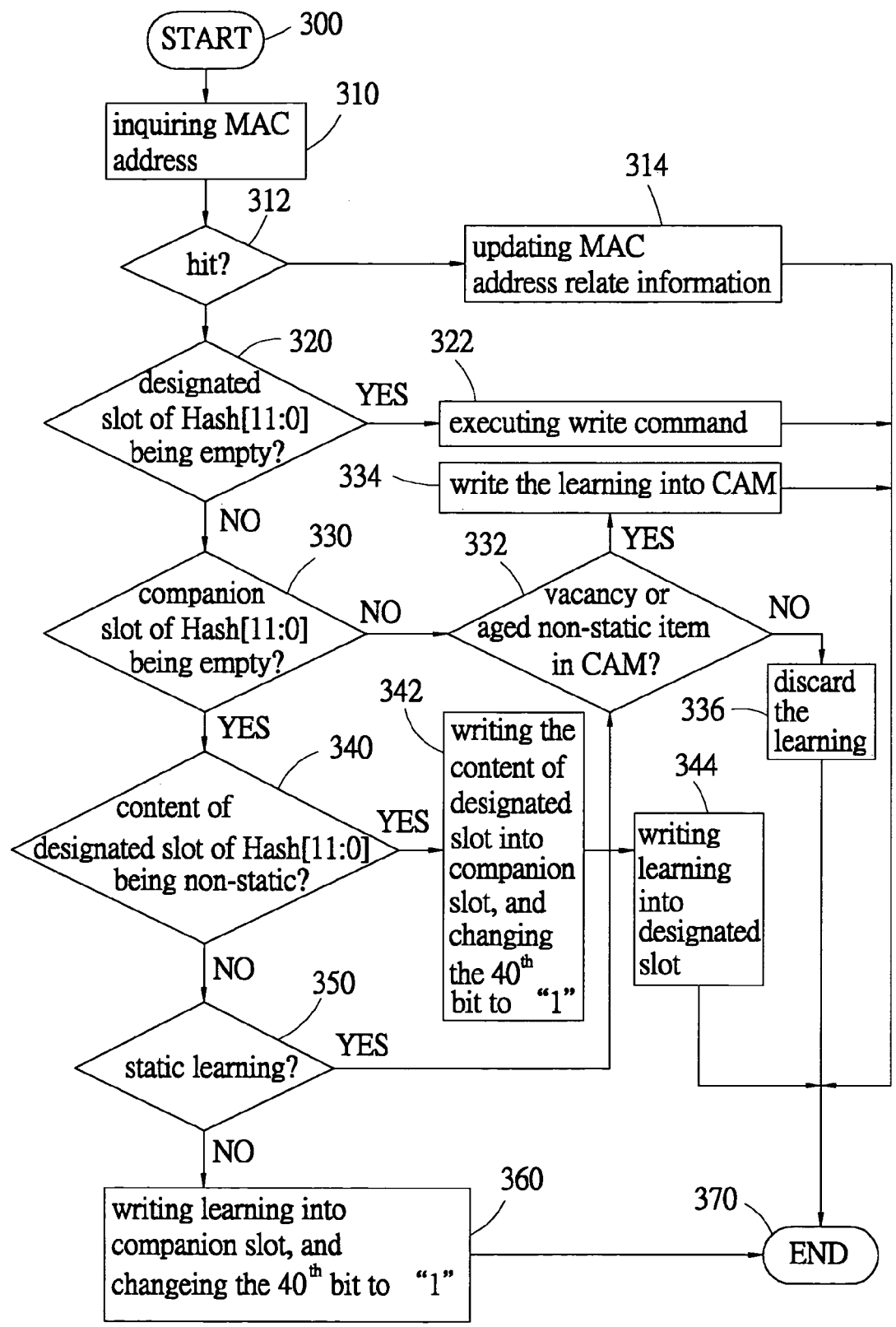
FIG. 3 shows a flowchart of the MAC address learning of an embodiment of the present invention.

FIG. 3 shows a flowchart of the MAC address learning of an embodiment of the present invention. When a packet is received, the packet includes a DMAC address and a SMAC address. The learning process starts with step 300. In step 310, the MAC address is inquired. Step 312 is to determine if a hit is found in CAM or MAC address table. If a hit is found, step 314 is taken to update MAC address related information, including port mask, overtime counter, and other related information. Then the process terminates with step 370. If no hit is found, step 320 is taken to determine if the designated slot is empty. If the designated slot is empty, step 322 is taken to write the higher MAC address MAC[47:12] and related information into the designated slot. If the designated slot is non-empty, step 330 is taken to determine if the companion slot of the bucket pointed by Hash[11:0] is empty. If the designated slot of Hash[11:0] is A slot, the companion slot is B slot, and vice versa. If the companion slot is non-empty, step 332 is taken to determine whether the CAM still has vacancy available or aged non-static items for evacuation. Step 334 is to learn the MAC address into the vacancy in the CAM or to replace the aged non-static items in the CAM, and terminates the process with step 370. Various designs can be used to determine the aged items. For example, if the overtime counter counts from "3" to "0", the counter with value less than "3" can be considered as aged and candidate for evacuation to avoid the overtime occupation of the CAM. On the other hand, if there is no suitable location to writing the MAC address learning, step 336 is taken to discard the learning and terminates with step 370. If the companion slot is empty, step 340 is taken to determine if the slot designated by Hash[11:0] is non-static. If the designated slot is non-static, step 342 is taken to move the non-static content to the companion slot and to modify the fortieth bit MAC[39] in the companion slot to become "1". Then, step 344 is taken to learn the MAC address (including static and non-static MAC address) to the slot designated by Hash[11:0], and terminates the process with step 370. If the slot designated by Hash[11:0] is static, step 350 is taken to determine either step 332 or step 360 should be taken next according to the current command. If the current command is a static learning command, step 332 is taken to learn the MAC address into the vacancy or locations occupied by non-static aged items in the CAM, or to discard this learning. If the current command is not a static learning command, step 360 is taken to learn the Mac address and related information into the companion slot and to modify the fortieth bit MAC[39] of the MAC address in the companion slot to become "1". Then, the process terminates with step 370.

In the aforementioned MAC address learning processing, the static-add learning command adds the MAC address for learning to designated slot or CAM, while the non-static items and non-static-add learning command uses the designated slot, companion slot and CAM for learning. The non-static items can be recorded in or moved to the related companion slot and identified by the modification of the fortieth bit.

Figure 4:
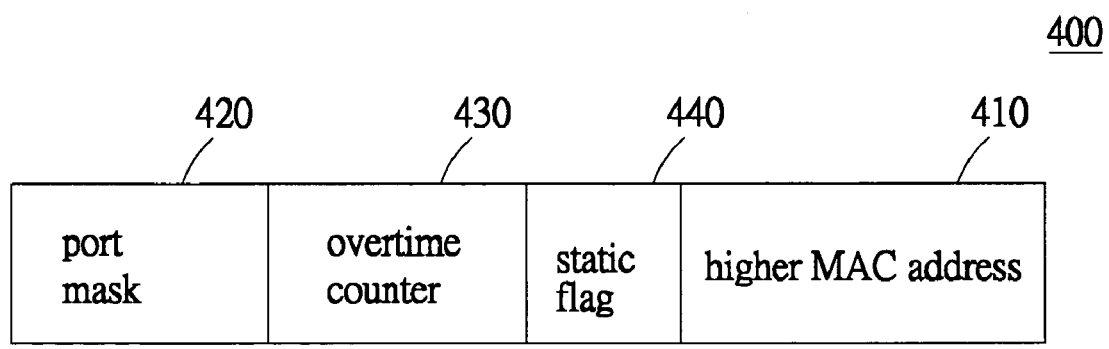
FIG. 4 shows a storage slot structure of an embodiment of the present invention.

FIG. 4 shows a schematic view of the slot structure of an embodiment of the present invention. The slot structure includes a higher MAC address 410 and related information, such as a port mask 420, an overtime counter 430, and a static flag 440. Overtime counter 430 is used for counting the temporal state of non-static learning. For example, a two-bit overtime counter 430 can count "3", "2", "1", and "0" to indicate 300 seconds. When overtime counter 430 counts from "3" to "0", it indicates the non-static item in the slot is aged and becomes a candidate for replacement when a static or non-static item requires using the location to store MAC address.

Figure 5:
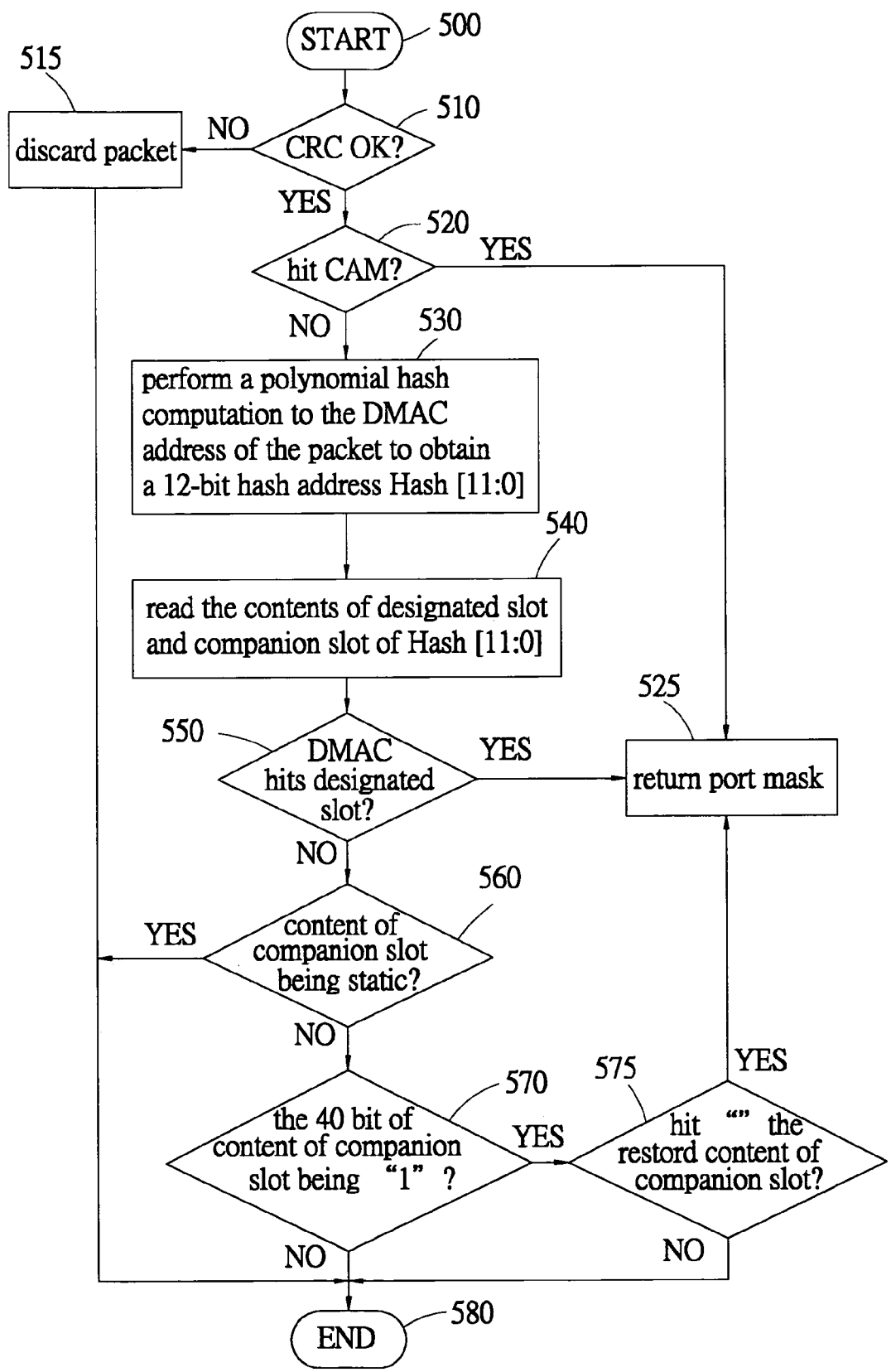
FIG. 5 shows a flowchart of the MAC address inquiry of an embodiment of the present invention.

FIG. 5 shows a flowchart of an MAC address inquiry corresponding to the leaning process of an embodiment of the present invention shown in FIG. 3. The inquiry process starts with step 500. Step 510 is to determine if the received packet is CRC correct. If the packet is not CRC correct, the packet is discarded in step 515. On the other hand, if the packet is CRC correct, step 520 is taken to determine if a "hit" is found in CAM. If a "hit" is found, step 525 is taken to return the port mask; otherwise, a further inquiry to dual-slot address table 200 (corresponding to FIG. 3) is taken. Step 530 is to perform a polynomial hash computation to the DMAC address of the packet to obtain a 12-bit hash address Hash[11:0]. Hash[1:1] specifies a bucket address and Hash[0] indicates a slot. Step 540 is to read the contents in the designated slot and the companion slot specified by Hash[11:0]. Step 550 is to determine if the DMAC address "hits" the designated slot. If so, the port mask is returned in step 525; otherwise, step 560 is taken to use the static flag to check whether the content of the companion slot is static. If the companion slot has static content, the inquiry finishes. If the companion slot has non-static content, the fortieth bit is checked. If the fortieth bit is "0", it indicates that the designated slot is occupied during the learning process; therefore, the inquiry is terminated with step 580. If the fortieth bit is "1", it indicates that the companion slot is occupied during the learning process, and step 575 should be taken to restore the fortieth bit MAC[39] of the companion slot from "1" to "0" and to perform a matching between the restored higher MAC address and the DMAC address of the packet. If the DMAC address matches the restored higher MAC address, the port mask is returned; otherwise, the inquiry terminates with step 580. If the inquiry of the MAC address results in no "hit" the packet is broadcasted.

Figure 6:
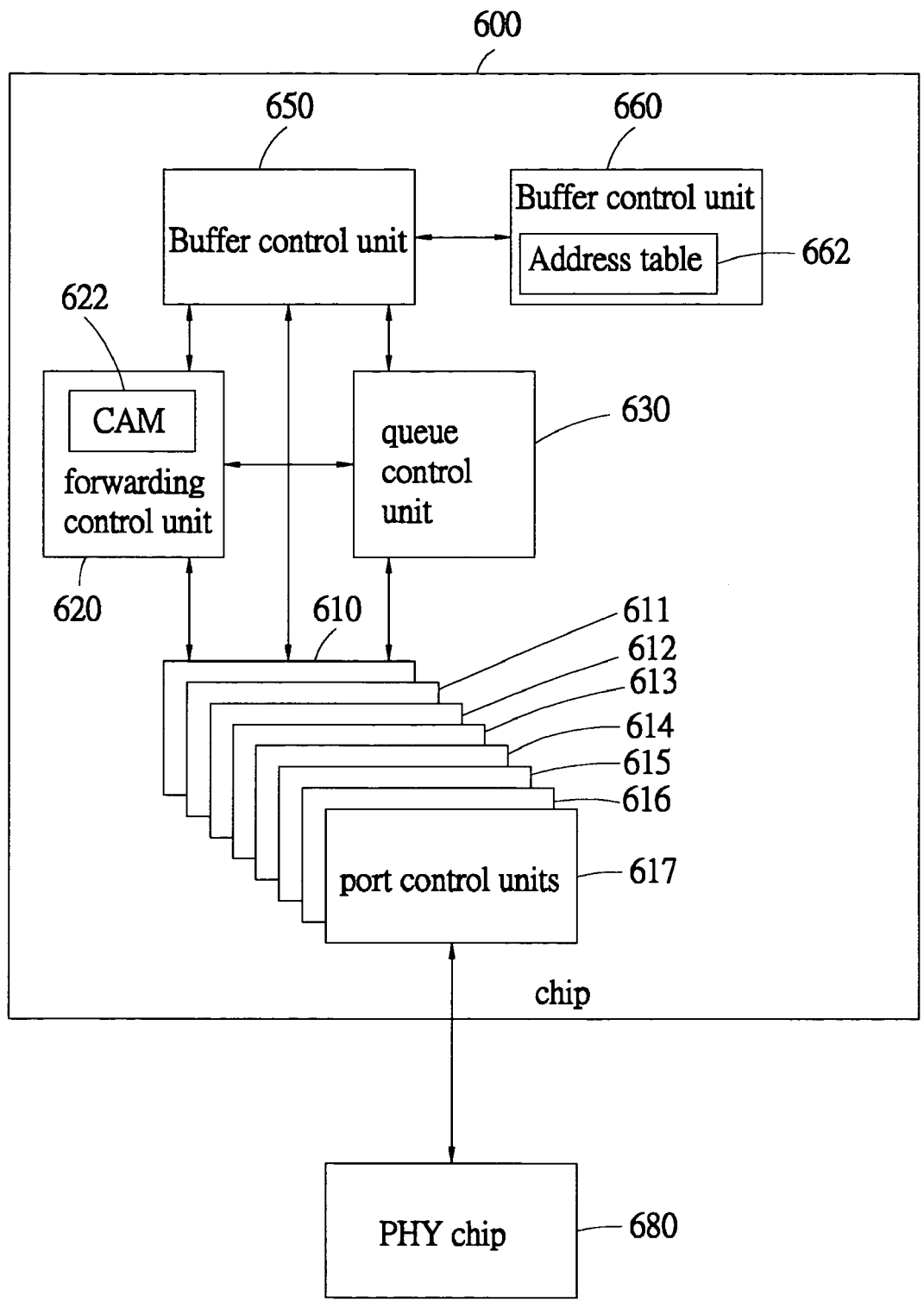
FIG. 6 shows a hardware block diagram of an embodiment of the present invention.

FIG. 6 shows a hardware block diagram of an embodiment of the present invention. An Ethernet switch includes a media access control (MAC) chip 600, and a physical layer control (PHY) chip 680. Preferably, MAC chip 600 is coupled to PHY chip 680 through a medium independent interface such as GMII or SGMII. MAC chip 600 includes port control unit 610-617 (using an 8-port switch as an example), a forwarding control unit 620, a queue control unit 630, a buffer control unit 650, and a buffer memory 660. Port control unit 610 is coupled with forwarding control unit 620, queue control unit 630 and buffer control unit 650. Buffer control unit 650 is coupled with buffer memory 660. Buffer memory 660 includes an address inquiry table. Forwarding control unit 620 uses hardware to implement an MAC 622 to store a plurality of MAC addresses and related information. PHY chip 680 is responsible for the Ethernet switch's transmitting and receiving of electrical signals. The aforementioned methods of the present invention are related to the design of forwarding control unit 620 of MAC chip 600. For example, a packet received by port 0 of an Ethernet switch reaches port control unit 610 through PHY chip 680. The DMAC address of the packet is used by the look-up table of the present invention to generate a port mask, and the higher part of the SMAC address of the packet is learned into inquiry table 662 or CAM622 through the learning method of the present invention. Buffer control unit 650 allocates a buffer of a suitable size in buffer memory 660 to temporarily store the packet. Queue control unit 630 uses the port mask to establish queue connections. Queue control unit 630 uses the queue length of each port to determine the buffer memory 660 consumed by each port, and issues signals to port control unit 610 to perform congestion control. According to the present invention, the dual-slot inquiry table 662 uses each MAC address to appoint the dual-slot of each bucket as a designated slot and a companion slot. By using the fortieth bit and the static flag to perform static learning and non-static learning of MAC addresses, it is possible to the physical space required of the inquiry table 662. On the other hand, the inquiry efficiency is improved by using CAM622 in forwarding control unit 620 to concurrently perform hardware matching with a plurality of MAC addresses and know whether there is a hit in CAM622 in a clock. Inquiry table 662 uses DMAC address to read the designated slot and the companion slot, selectively restore the content of the companion slot, determines whether there is a hit in designated slot or companion slot, and returns the result.

There are various integration methods for the embodiment of the FIG. 6. For example, buffer memory 660 can be integrated into MAC chip 600 or an external add-on chip. The memory can be SRAM, SDRAM, or DDRAM, and so on. Physical chip 680 is usually an external add-on chip because it requires particular fabrication process to provide physical layer control to a plurality of ports. But as the integration improves, PHY chip 680 can also be integrated into MAC chip 600.

In summary, the present invention provides a method for learning medium access control (MAC) address, including the steps of: using a hash function to compute a hash value of an MAC address, using the hash value to one-to-one map to a designated slot, and using the MAC address to map to the designated slot and a companion slot of the address table; if designated slot is empty, the MAC address is learned into the designated slot; if the designated slot is non-empty, the companion slot is empty and the contents in the designated slot is not static, the contents of the designated slot is moved to the companion slot, the fortieth bit of the higher MAC address of the contents in the companion slot is modified and the MAC address is learned into the designated slot; if both designated and companion slot are non-empty, the MAC address is learned into CAM; if the designated slot is non-empty, the companion slot is empty and the contents of the designated slot are static, the fortieth bit of the higher MAC address is modified and the modified MAC address is learned into the companion slot in response to the non-static learning command. This shows the learning advantage of a dual-slot address table and saves the hardware gates in the address table. For example, the address table has $2^X$ access slots, and each access slot can store the 48-X bits of the MAC address and related information. The MAC address is 48-bit long, and X is a positive integer. The related information preferably includes a port mask, an overtime counter and a static flag.

The present invention also provides a method for searching MAC address, including the steps of: using MAC address to map to the designated slot and the companion slot in the address table; reading a first content in the designated slot and a second content in the companion slot; comparing MAC address with the first content and comparing the MAC address with the restored second content; and generating an inquiry result in accordance with the results of the comparison, such as port mask. For example, the selective restoration step is performed in accordance with the static flag of the second content and the fortieth bit of the higher MAC address.

The present invention further provides an MAC chip, including a buffer memory, having an address table, for storing packet; a plurality of port control units coupled to the PHY control chip; a forwarding control unit having content-addressable memory (CAM), coupled to port control unit; a queue control unit coupled to the forwarding control unit and the port control unit; and a buffer control unit coupled the buffer memory, the queue control unit and the port control units. The forwarding control unit uses MAC address to map to the designated slot and the companion slot in the address table. If the designated slot is empty, the MAC address is learned into the designated slot. If the designated slot is non-empty, the companion slot is empty and the content of the designated slot is non-static, the contents of the designated slot is moved to the companion slot, the fortieth bit of the higher MAC address of the contents in the companion slot is modified and the MAC address is learned into the designated slot.

Although the present invention has been described with reference to the preferred embodiment thereof and the best mode for carrying out the invention, it is apparent to those skilled in the art that a variety of modifications and changes may be made without departing from the scope of the present invention which is intended to be defined by the appended claims.

What is claimed is:

1. A method for learning medium access control (MAC) address, comprising the following steps:
   (a) mapping an MAC address to a designated slot and a companion slot in an address table;
   (b) if said designated slot being empty, learning said MAC address into said designated slot; and
   (c) if said designated slot being non-empty, said companion slot being empty and the content of said designated slot being non-static, moving the content of said designated slot to said companion slot and modifying a bit of the higher part of said MAC address in said companion slot and learning said MAC address into said designated slot.

2. The method as claimed in claim 1 further comprising the following step:
   (d) if said designated slot being non-empty and said companion slot being non-empty, learning said MAC address into a content addressable memory (CAM).

3. The method as claimed in claim 1 further comprising the following step:
   (e) if said designated slot being non-empty and said companion slot being empty, modifying a bit of the higher part of said MAC address and learning said modified MAC address into said companion slot in response to a non-static learning command.

4. The method as claimed in claim 1, wherein said step (a) uses a hash function to compute a hash value of said MAC address and uses said hash value to map one-to-one to said designated slot.

5. The method as claimed in claim 1, wherein said step (a) uses direct mapping to map said MAC address to said designated slot.

6. The method as claimed in claim 1, wherein said step (b) writes the higher part of said MAC address and related information into said designated slot.

7. The method as claimed in claim 1, wherein said address table comprises $2^X$ slots, said designated slot is used to store said (48-X) bits of said MAC address and related information, and said MAC address is 48-bit long, where X is a positive integer.

8. The method as claimed in claim 3, wherein said step (e) modifies a fortieth bit of said MAC address.

9. The method as claimed in claim 6, wherein said related information comprises a port mask, an overtime counter and a static flag.

10. A method for MAC address inquiry, comprising the following steps:
    (a) mapping an MAC address to a designated slot and a companion slot of an address table;
    (b) reading a first content of said designated slot and a second content of said companion slot;
    (c) selectively restoring said second content;
    (d) comparing said MAC address with said first content and said MAC address with said restored second content; and
    (e) generating an inquiry result according to said comparisons.

11. The method as claimed in claim 10, wherein said step (c) selectively restores said second content according to a static flag and a fortieth bit of the higher part of an MAC address of said second content.

12. The method as claimed in claim 10, wherein said inquiry result is a port mask.

13. The method as claimed in claim 10, wherein said address table comprises $2^X$ slots, said designated slot is used to store said (48-X) bits of said MAC address and related information, and said MAC address is 48-bit long, where X is a positive integer.

14. The method as claimed in claim 10 further comprising the following step:
    (f) comparing said MAC address with a content addressable memory (CAM) for matching.

15. The method as claimed in claim 13, wherein said related information comprises a port mask, an overtime counter and a static flag.

16. A medium access control (MAC) chip, comprising:
    a buffer memory having an address table for storing packets;
    a plurality of port control units for coupling with a physical layer control chip;
    a forwarding control unit for coupling with said port control unit;
    a queue control unit for coupling said forwarding control unit and said port control units; and a buffer control unit for coupling said buffer memory, said queue control unit and said port control units;

wherein said forwarding control unit uses an MAC address to map to a designated slot and a companion slot in said address table; if said designated slot is empty, said MAC address is learned into said designated slot; if said designated slot is non-empty, said companion slot is empty and the content of said designated slot is non-static, said content of said designated slot is moved to said companion slot, a bit of the higher MAC address of said content in said companion slot is modified and said MAC address is learned into said designated slot.

17. The chip as claimed in claim 16, wherein said forwarding control unit further comprises a content addressable memory (CAM), said forwarding control unit first compares said MAC address with said CAM; if no match is found, said forward control unit further compares said MAC address with designated slot and companion slot of said address table.

18. The chip as claimed in claim 16, wherein said bit of the higher MAC address is the fortieth bit of an MAC address.

19. The chip as claimed in claim 17, wherein said address table comprises $2^X$ slots, said designated slot is used to store said (48-X) bits of said MAC address and related information, and said MAC address is 48-bit long, where X is a positive integer.

20. The chip as claimed in claim 17, wherein said MAC address is discarded by said forwarding control unit if said designated slot is non-empty, said companion slot is non-empty and no vacancy available in said CAM.

\* \* \* \* \*